Oct. 28, 1958 G. R. HYKES 2,858,407
SHOCK-MOUNTED OVEN DEVICE
Filed April 24, 1957 3 Sheets-Sheet 1

INVENTOR.
GLENN R. HYKES
BY Moody and Goldman
ATTORNEYS

Oct. 28, 1958  G. R. HYKES  2,858,407
SHOCK-MOUNTED OVEN DEVICE
Filed April 24, 1957  3 Sheets-Sheet 3

INVENTOR.
GLENN R. HYKES
BY Moody and Goldman
ATTORNEYS

United States Patent Office 2,858,407
Patented Oct. 28, 1958

2,858,407

SHOCK-MOUNTED OVEN DEVICE

Glenn R. Hykes, Cedar Rapids, Iowa, assignor to Collins Radio Company, Cedar Rapids, Iowa, a corporation of Iowa Application April 24, 1957, Serial No. 654,805

7 Claims. (Cl. 219—19)

This invention relates generally to shock-mounted temperature-controlling devices, such as can be used to stabilize a component, like a frequency-determining crystal found in vehicular electronic equipment.

In the past, special vibration and shock precautions were generally not taken in regard to crystal ovens used in vehicular equipment other than by appending conventional shock mounts externally to the container supporting the entire equipment.

Although conventional vibration and shock mounts generally attenuate most vibration and shock sufficiently to prevent damage and instability to most electronic gear, there exist certain components, such as frequency-controlling crystals, which can be made unstable and at times destroyed by that vibration and shock transmitted through conventional shock absorbers.

As a result of conventional approaches to the shock problem, vehicular-mounted crystals failed to have the stability obtainable in stationary locations. Thus, a crystal-oscillator circuit providing a stability of one or two parts in $10^9$ per day at a stationary location was fortunate to provide one part in $10^6$ in a moving vehicle such as an aircraft.

Furthermore, shock can be particularly hazardous to some cuts of crystals, like the high-frequency AT cut, which have been broken in ovens not using this invention during ordinary vehicular use. The weight of a crystal combined with its cantilever type of mounting has an audio-resonant frequency, which unfortunately is within the range of vibrations of many vehicles.

Also, vibration of a crystal causes frequency modulation of its oscillator output, due to several factors. For one, the capacitance between the crystal and proximate ground-plane varies. For another, the mechanical stress-and-strain complex within the crystal varies at the vibration rate to cause corresponding variations in the crystal's frequency.

The invention enables an oven of small size, that can control its internal temperature to within one-thousandth of a degree centigrade, to be isolated from the transmission of vibration and shock in all of the six types of three dimensional vibration throughout the lower and middle audio frequency ranges, which are the most disturbing ranges to crystal operation.

The invention uses in its combination a resilient material obtained by the chemical reaction of polyisocyanates and resinous polymers, wherein a copolymerization of the resin and isocyanates occur and a gassing reaction produces carbon dioxide which expands and causes a multiple cell resilient plastic body. A typical commercial preparation is found under the trademark, Lockfoam, type SX-49, made to a density between ten and sixteen pounds per cubic foot. The invention includes a vacuum bottle which has an outer coating of this resilient material. Fastening means are imbedded in the material but do not contact the vacuum bottle. The fastening means is connected to a support such as a chassis, and all shock and vibration must then be transmitted through the resilient material. A cylindrical oven is provided within the vacuum bottle but is further isolated vibration and shockwise from the vacuum bottle by a resilient plug and cap arrangement. The oven includes a special coil, comprising a temperature-sensitive bridge arrangement, wound over most of its length. The object to be temperature-controlled, such as a crystal, is mounted in the oven.

Further objects, features and advantages of this invention will be apparent to a person skilled in the art upon further study of the specification and the accompanying drawings, in which.

Figure 3:
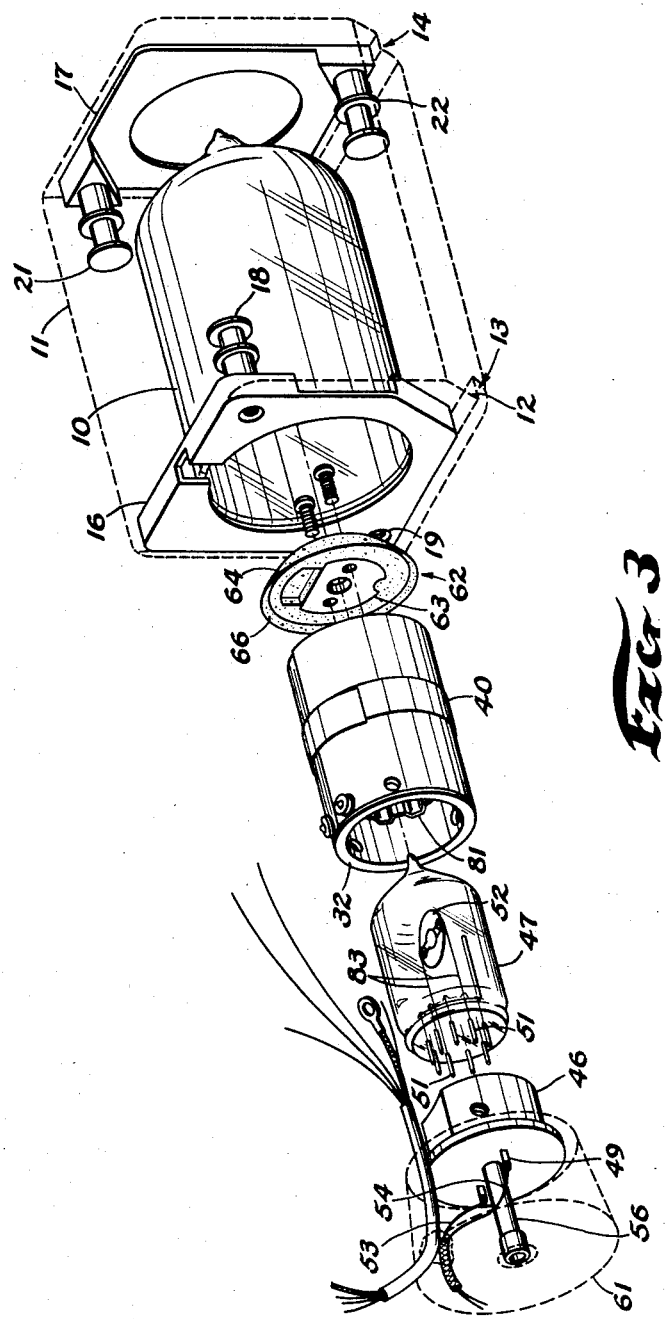
Figure 3 illustrates an exploded view of the invention.
Figure 4:
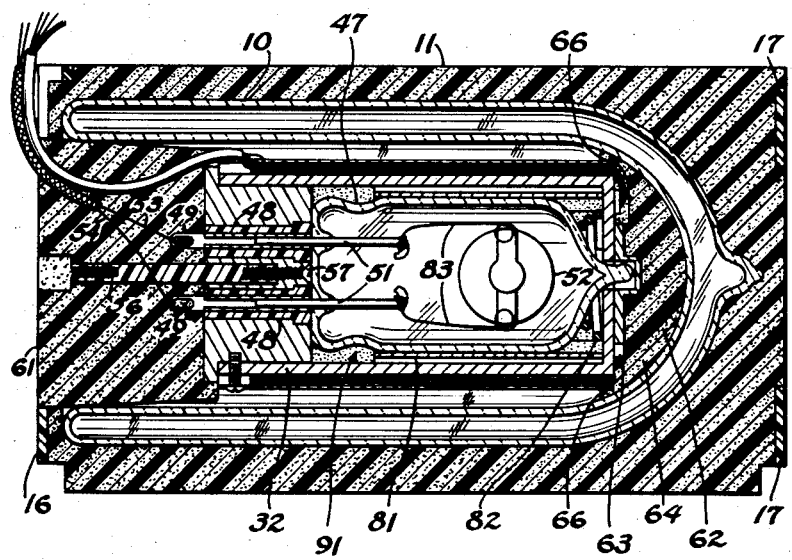
Figure 4 shows a sectional view taken along plane 4—4—4—4 in Figure 1.

Now referring to the drawings in order to explain the detailed embodiment of the invention shown there, reference is first made to Figures 3 and 4 where a vacuum bottle 10 is shown. Such vacuum bottles are well-known in the art. They are made of a double wall of glass with a mirror-like finish for the reflection of radiant thermal energy. The space between the double wall is sealed and evacuated.

A thick layer 11 of the resilient material described above surrounds and adheres to the outer surface of bottle 10. The outer surface of resilient layer 11 has a shape similar to a parallelepiped, although it has three rounded edges, a beveled edge 12, and notched ends 13 and 14 to enable fitting the device into a particular chassis arrangement (not shown). A pair of nylon plates 16 and 17 are imbedded in opposite ends of resilient layer 11. The above-described resilient material has the characteristic of firmly bonding itself to nylon. Each nylon plate has a pair of diagonally positioned studs 18, 19 and 21, 22 extending within resilient layer 11. The shoulders formed with the studs enhance the bond between the nylon plates and the resilient layer. Each stud 18, 19, 21, and 22 is internally threaded to enable external screws (not shown) to fasten the oven assembly to a chassis arrangement (not shown).

Figure 1:
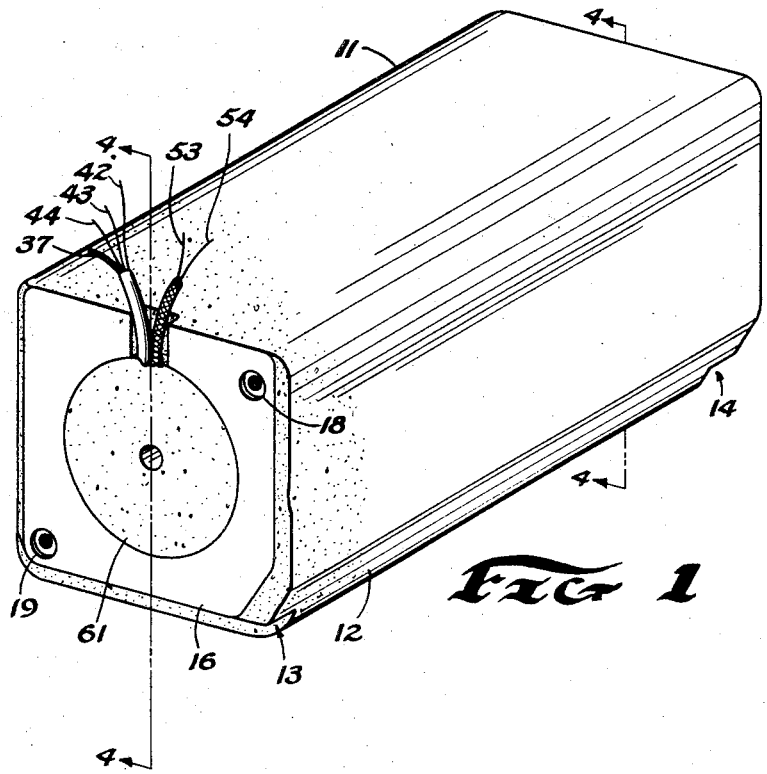
Figure 1 is a perspective view of an assembled embodiment of the invention.
Figure 2:
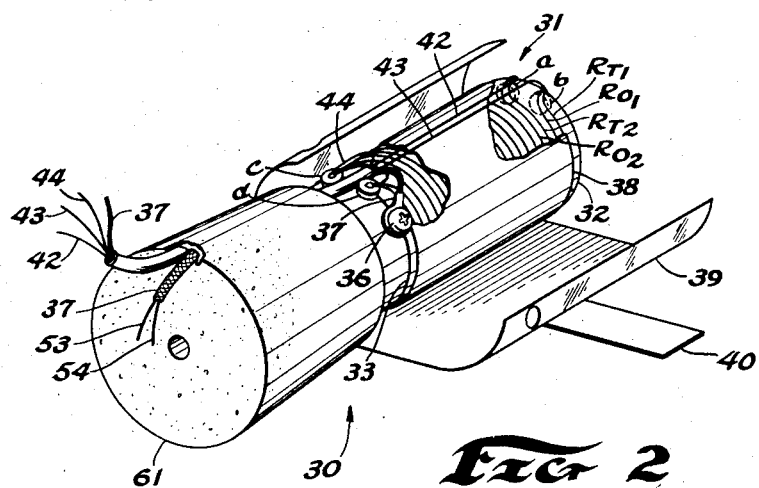
Figure 2 is a perspective and partially exploded view of an internal portion of the invention.
Figure 5:
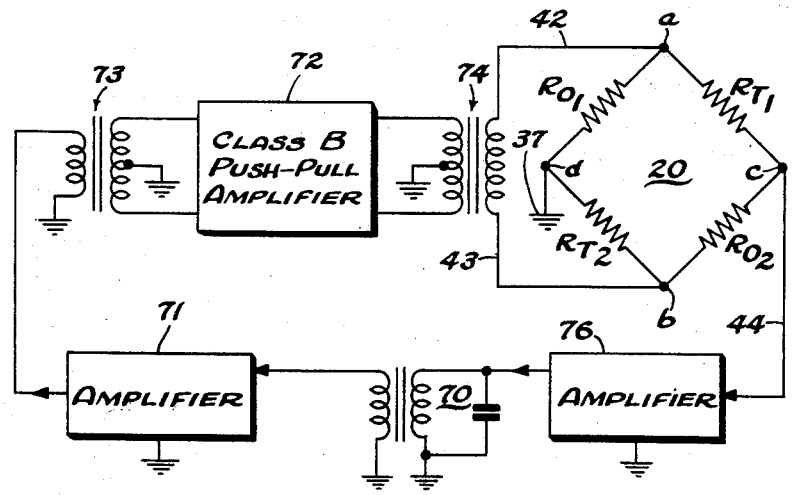
Figure 5 illustrates a feedback circuit which can be utilized with the invention.

An internal oven portion 30, illustrated in partially unraveled form in Figure 2, is supported within vacuum bottle 10 as shown in Figure 3. Internal portion 30 includes an oven member 31 having a metallic can 32, cylindrical in shape and open at one end. Can 32 is preferably made of material having a large thermal coefficient such as aluminum or copper. Two pair of terminals $a$, $b$ and $c$, $d$ are mounted respectively near opposite ends of the can and are insulated electrically therefrom. A layer of insulating paper 33 is provided about the outside cylindrical surface of the can and four bridge-circuit windings $R_{T_1}$, $R_{O_1}$, $R_{T_2}$ and $R_{O_2}$ are wound sequentially about the can forming a single layer. A schematic of this bridge arrangement is illustrated in Figure 5 where it is seen how the windings connect between the terminals. The opposite bridge legs $R_{O_1}$ and $R_{O_2}$ each comprise wire having very nearly a zero temperature coefficient. The remaining opposite bridge legs $R_{T_1}$ and $R_{T_2}$ consist of wire having a very high temperature coefficient such as is provided by nickel wires.

A fifth terminal 36 is also provided (see Figure 2) and is electrically connected to can 32. A ground lead 37 connects to terminal 36 so that the can is maintained at ground potential level. Terminal $d$ is electrically connected to grounded terminal 36 to provide the grounded terminal point of the bridge shown in Figure 5.

A second layer of insulating paper 38 is provided about the coiled-bridge windings, and a layer of shiny metallic foil 39 is provided about this insulating paper to present a thermal-radiation-reflecting surface that further assists in the temperature stability of the oven. A layer of electrical tape 40 is wound about foil 39 to hold it in place.

The bridge is connected to an external regulating circuit by means of insulated leads 42, 43 and 44. Thus, leads 42 and 43 pass over aluminum foil 39 (when properly wrapped) and connect to the respective terminals $a$ and $b$.

A socket member 46 is received by and fastened to the open end of can 32. Socket 46 is made of aluminum and has insulating inserts 48 that support pin receptacles 49. A vacuum tube 47 is supported within can 32 and has pins 51 that are received by socket receptacles 49. A crystal 52 is mounted within vacuum tube 47. Shielded leads 53 and 54 respectively connect to socket receptacles 49.

Also, a stud member 56 is received centrally within socket 46 and is fastened thereto by a screw 57. Stud 56 is made of insulating material and is chosen to have minimum thermal conductivity. It is internally threaded at its outer end so that a screw (not shown) may be inserted therein to enable ejection of internal portion 30 without pulling on the leads.

A plug 61, made of the same resilient material described above, is bonded to the bottom of socket 46. This type of resilient material has been found to adhere readily to many different types of material such as nylon and aluminum. Thus, resilient plug 61 is molded directly to the end of socket 46.

Socket 46 is inserted within can 32 and is connected thereto by a plurality of screws, one of which provides grounded terminal 36.

The greatest possible source of heat loss from the oven is through leads 53 and 54, the receptacles, the pins, and wires 83 which directly connect between crystal 52 and the outside atmosphere. This source of loss can directly lower the temperature of the crystal below the remaining oven temperature and can cause an undesirable temperature gradient to exist within the crystal.

The invention minimizes this source of loss by the mass of aluminum of socket 46 through which receptacles 49 pass. This aluminum mass provides a large heat conducting path through which heat passes from the walls of can 32 to the receptacles. Electrical insulation inserts 48 about the pins are made as thin as possible to maintain a minimum temperature gradient across them, while maintaining the required electrical insulation.

With the pins being maintained at nearly the temperature of the oven walls by this technique, there is virtually no temperature gradient between them and the crystal. Accordingly, almost no heat loss is then caused from the crystal down leads 83.

In order to minimize any temperature gradient in the oven, it is preferable to provide black surfaces for can 32 and socket 46. A tight contact between them should be provided to assist mutual conduction. However, the surface of socket 46, that contacts plug 61, can be made shiny to minimize over-all heat loss to plug 61.

A socket was experimentally made of insulating material and was found to adversely affect the temperature stability within the oven for the above-stated reasons.

Where the crystal is in a vacuum, the only manner of heating it is by radiation through the glass walls of tube 47 and by conduction up-leads 83. Also, it has been found that the temperature of the glass is maintained more uniform by filling the entire available space between tube 47 and can 32 with a silicon grease 91. Furthermore, the thick layer of resilient material provided by plug 61 adds thermal insulation across the open end of the vacuum bottle. The leads are brought out through the resilient material of plug 61.

A cap member 62 is fastened by screws to the closed end of can 32. It consists of a metal insert member 63 having a bonded dome 64 of the above-described resilient material. Dome 64 has a lip edge 66 that radially separates the closed end of can 32 from the inner surface of vacuum bottle 10. Dome 64 and its overlapping edges 66 are viewable in Figure 4 to further isolate one end of internal member 30 vibration and shock-wise from the internal surfaces of vacuum bottle 10.

Many types of temperature-regulating circuits are known which may be used with this invention. A preferred type is shown in Figure 5, because it provides continuous operation, thus avoiding any off-on cycling. This circuit provides an oscillatory feedback loop, which may oscillate at, for example, five kilocycles per second. Parallel-resonant circuit 70 provides the frequency-determining element of the circuit. An amplifier 71 is coupled transformer-wise to resonant circuit 70. A class B power amplifier 72 is coupled by a transformer 73 to the output of amplifier 71. Power amplifier 72 is preferably class B push-pull for efficiency reasons and phase splitting is' done by transformer 73. The output of push-pull amplifier 72 is provided through another transformer 74 to terminals $a$ and $b$ of bridge 20.

The wires comprising the bridge act as the heating elements for the oven. At a given required temperature, the bridge obtains a small output voltage near its balanced condition between terminals $c$ and $d$; wherein precisely the proper amount of heat is supplied to the oven to just equalize losses. In this case, the bridge output causes a regenerative phase in resonant circuit 70, oscillation occurs, and the resulting power applied to bridge 20 maintains the oven at the required temperature. It has been found that this type of oscillatory bridge feedback arrangement within the invention is capable of maintaining a temperature stability within one-thousandths of a degree centigrade.

If for some reason the oven should be overheated, an opposite type of unbalance is provided by the bridge and its output to resonant circuit 20 is the degenerative which prevents or damps out circuit oscillation. This provides a safety factor.

Vacuum tube 47 is firmly supported within the oven by a corrugated metallic spring shield 81 that surrounds the tube, and a cap spring 82. The tipped end of tube 47 extends through central openings in the closed end of can 32, and cap insert 63.

Crystal 52 is supported within the vacuum tube by wire supports 83 that connect to pins 51. It can be seen from the physical configuration, wherein the mass of crystal 52 is located at the ends of wires 83, that there is similarity to a pendulum. Thus, it vibrates mechanically at frequencies likely to be in the audio range. Several frequencies are simultaneously involved because the configuration is capable of vibrating in several modes, such as in the plane of the paper of Figure 2, transverse to the paper and torsionally about the axis of tube 47. These vibration modes can, however, be induced by other modes of vibration by the entire assembly, unless sufficiently attenuated.

It can be seen in Figure 4 that the oven is insulated in a plural manner from shock and vibration by a chassis to which it would be mounted. Thus, the shock and vibration must pass first through outer layer 11 of resilient material where much attenuation occurs. It has been found that the resilient-material-covered vacuum bottle can be dropped many feet onto a concrete floor without breaking the bottle.

Any shock or vibration that reaches vacuum bottle 10 must yet pass through the resilient material of plug 61 and cap 62 before it can reach the crystal. Due to the positioning of plug 61 and cap 62 at extreme ends of the oven, efficient attenuation is obtained. In particular with plug 61, its engagement with bottle 10 is at its outer edges due to its wedged shape. Consequently, the most undesirable vibration modes, as far as the crystal is concerned, cause a lateral flexing of plug 61, which obtains maximum energy dissipating qualities for the resilient material of plug 61 and great attenuation of shock and vibration. Thus, the crystal receives maximum protection.

The invention is capable of small size, and a model of the invention is smaller than the view of Figure 4.

Although this invention has been described with respect to a particular embodiment thereof, it is not to be so limited as changes and modifications may be made therein which are within the full intended scope of the invention as defined by the appended claims.

I claim:

1. A shock-mounted oven device comprising a vacuum bottle formed with an open end and a closed end, a resilient material formed about said vacuum bottle, supporting means imbedded within said resilient material and being separated from said bottle, said resilient material comprising a thermosetting cellular structure from the chemical reaction of polyisocyanates and resinous polymers, an oven member including a heating and temperature control means received within said vacuum bottle, a cap of resilient material received between one end of said oven and the closed internal end of said vacuum bottle, a plug of resilient material received within the open end of said vacuum bottle, and means fastening said plug to the other end of said oven.

2. A shock-mounted oven device comprising a vacuum bottle having a mirror-like finish, said vacuum bottle having one end open and one end closed, a layer of resilient material formed about the outer surfaces of said vacuum bottle, supporting means imbedded within said outer layer of resilient material, an electrically controlled oven received within said vacuum bottle, said oven comprising a heating and temperature control element, a cap of resilient material received between one end of said oven and the closed end of said vacuum bottle, a plug of resilient material received between the other end of said oven and the other end of said vacuum bottle, electric leads passing through said plug and connecting to said oven.

3. A shock-resistant electronically-controlled oven comprising a vacuum bottle having a double wall with evacuation therebetween, said bottle also having a mirror-like surface and formed with one open end and one closed end, a resilient material formed about the external surface of said vacuum bottle, an electronically-controlled oven received within said bottle, said oven including a hollow metallic cylinder, a wire-heating coil wound substantially over the entire outer surface of said oven cylinder, a resistance bridge being formed of said wire coil, a cap of resilient material received between one end of said oven and one end of said vacuum bottle, a socket member of conducting material received within the other end of said oven cylinder and fastened thereto, a plug of resilient material adhering to the outer end of said socket member, said plug received through the open end of said vacuum bottle and supported therein, said resilient plug formed with a truncated-cone shape, a plurality of electrical leads received through said plug member and respectively connected to said resistance bridge and to said socket member.

4. A shock-resistant electronically-controlled oven as defined in claim 3 in which the resilient material forming said outer layer, plug, and cap is obtained by the chemical reaction of polyisocyanates, and resinous polymers, and has a density within the range of ten to sixteen pounds per cubic foot.

5. A shock-mounted oven device as defined in claim 4 wherein said resilient material has a density of about 13.9 pounds per cubic foot.

6. A shock-mounted oven device as defined in claim 3 comprising a vacuum tube supported within said oven, silicon grease filling the space between said vacuum tube and the inner surface of said vacuum bottle, and means connecting said tube output to said socket member.

7. A shock-mounted oven device as defined in claim 3 further including, a layer of insulating material wrapped about the outer surface of said cylinder, a first pair of terminals fastened to one end of said cylinder but electrically insulated therefrom, a second pair of terminals fastened near the other end of said cylinder with at least one of said second pair being electrically insulated therefrom, a temperature-sensing resistance bridge wound about said cylinder, the four corners of said bridge being respectively connected to said first and second pairs of terminals, at least one arm of said bridge having a different temperature constant than another arm of said bridge, a second layer of insulating paper being provided about said coils of wire, a layer of aluminum foil being provided about said second layer of insulating paper, said electrical leads being connected to the four terminals of said bridge and passing out through said plug, said resilient material being obtained by the chemical reaction of polyisocyanates and resinous polymers, a temperature and shock controlled device supported within said cylinder, with spring-biasing means received between them, a black finish being provided on the inner surfaces of said cylinder and said socket member, and silicon grease being provided in the space between said cylinder and said device.

References Cited in the file of this patent

UNITED STATES PATENTS

| | | |
|---|---|---|
| 2,178,909 | Kamenarovic | Nov. 7, 1939 |
| 2,203,545 | Peterson | June 4, 1940 |
| 2,643,021 | Freedman | June 23, 1953 |
| 2,616,020 | Fay et al. | Oct. 28, 1952 |
| 2,759,617 | Gauthier | Aug. 21, 1956 |

FOREIGN PATENTS

| | | |
|---|---|---|
| 5763/32 | Australia | Jan. 19, 1933 |

OTHER REFERENCES

Modern Packaging; November 1956, p. 115.